US005582742A

United States Patent [19]

Wilkie et al.

[11] Patent Number: 5,582,742

[45] Date of Patent: Dec. 10, 1996

[54] ROTARY DISTRIBUTION PIPE ASSEMBLY

[75] Inventors: William J. Wilkie, Escondido; Paul B. Blackburn, El Cajon, both of Calif.

[73] Assignee: Ketema, Inc., Denver, Colo.

[21] Appl. No.: 523,632

[22] Filed: Sep. 5, 1995

[51] Int. Cl.$^{6}$ .................................................. B01D 21/26

[52] U.S. Cl. .................. 210/781; 210/360.1; 210/380.1; 29/890.142; 239/225.1; 239/380; 239/538; 239/590.3

[58] Field of Search ............................... 239/589, 590.3, 239/590.5, 481, 487, 462, 225.1, 380, 538; 29/890.142; 210/780, 781, 787, 360.1, 380.1, 391

[56] References Cited

U.S. PATENT DOCUMENTS

| | | | |
|---|---|---|---|
| 648,088 | 4/1900 | Shue | 239/214 |
| 2,648,568 | 8/1953 | Sommer | 299/63 |
| 2,695,002 | 11/1954 | Miller | 118/51 |
| 2,994,482 | 8/1961 | Valois et al. | 239/117 |
| 3,136,324 | 6/1964 | Yendley | 134/129 |
| 3,146,953 | 9/1964 | Komanns | 239/538 |
| 3,348,767 | 10/1967 | Ferney . | |
| 3,353,752 | 11/1967 | Ranhagen et al. | 239/538 |
| 3,405,866 | 10/1968 | Amero . | |
| 3,880,357 | 4/1975 | Baisch | 239/380 |
| 4,637,872 | 4/1987 | Balkus | 209/453 |
| 4,894,171 | 1/1990 | Nichols | 210/379 |

OTHER PUBLICATIONS

Ferrum, Product Literature, 2 pp. (Jun. 1994).

Krauss Maffel, Vertical Centrifuge VZ–Ph, 1 page (Jun. 1994).

Ketema, Tolhurst Basket Centrifuge, 4 pp. (1993).

*Primary Examiner*—David A. Reifsnyder
*Attorney, Agent, or Firm*—Baker, Maxham, Jester & Meador

[57] ABSTRACT

For a filtering-type centrifuge, a pipe assembly composed of a stationary outer pipe with a concentric rotatable inner pipe. The outer pipe has a longitudinally extending distribution port, while the inner pipe has a helically shaped discharge port. The assembly is placed inside the centrifuge and inside of a filtering basket. As the inner pipe turns, portions of the distribution port are intersected by portions of the discharge port. This causes the slurry to exit the inner pipe at the intersection positions and be distributed in an even fashion on the basket.

33 Claims, 7 Drawing Sheets

ROTARY DISTRIBUTION PIPE ASSEMBLY

BACKGROUND OF THE INVENTION

1. Field of the Invention

This invention is directed generally toward a centrifugal separator and more particularly pertains to an apparatus for providing an evenly-distributed slurry feed to a filtering basket of the centrifugal separator.

2. Description of the Related Art

A centrifuge is a machine which uses centrifugal force for separating substances of different densities such as liquids and solids contained in a slurry mixture. In a filtering-type centrifuge a slurry feed is introduced to a filter basket rotating at a high angular velocity. The centrifugal force generated by the rotating basket removes the liquid components of the slurry from the solid components. The liquid components are forced to flow through perforations in the filtering basket while the solid components are retained on a filtering media placed inside the basket. The remaining solid components on the filtering basket are referred to as a cake.

Typically, most feed slurries have been injected into a filtering-type centrifuge through a stationary pipe. Such an operation relies upon the liquid nature of the slurry and the centrifugal force generated by the rotating basket to level the solid components which are collected in the basket. This leveling action helps prevent ridges from forming in the cake. Ridges are undesirable because they tend to imbalance the basket causing vibration stress to be introduced to the entire centrifuge system. Further, the ridges make subsequent washing of the cake very difficult. In the case of a very fast dewatering slurry, the solids are deposited at the point of discharge from the stationary pipe and therefore are not distributed evenly because the liquid which would normally carry them throughout the basket simply filters away too quickly. There is a long-felt need in the art for a method and apparatus for providing an evenly distributed liquid-solid slurry feed to a filtering basket centrifuge so that an even cake is created on the filtering media without significant ridges.

In the past, several different methods have been used to attempt to provide such an evenly distributed liquid-solid slurry feed to a filtering basket centrifuge. One inexpensive prior art solution is a multi-ported pipe installed in the centrifuge. For example, instead of having only one discharge point, three or four openings are provided in the pipe from which discharge occurs. Thus, the solids are distributed at various locations along a basket surface. A problem occurs with a multi-ported feed pipe-type system when such a pipe is installed in a vertical basket-type centrifuge. Since the slurry is fed from all openings simultaneously, a greater flow mass occurs at the bottom openings than at the top due to gravity. In order to compensate tier this, the size of the lower openings have to be reduced to allow more flow mass to be apportioned through the upper openings. Due to the decrease in size of the lower openings, the velocity of the slurry leaving the bottom openings is greater than the velocity of the slurry as it leaves the top openings. An increased velocity at the bottom tends to increase the chance that the feed will splash backwards. Such backward splash tends to cause the liquid/solid slurry to exit the basket through the spoked bottom. This contaminates clean, washed cake that may have been discharged during prior batches. In order to compensate for the increased possibility of splash, flow velocity must be kept at a very low rate. This introduces problems because control methods for regulating velocities must be added to the system. In some situations, For example, because of very high flow rates or very dense slurry mixtures, it may not even be economically feasible to attempt to regulate velocities.

Another attempt at providing an evenly-distributed slurry feed to a filtering basket centrifuge was made by utilizing a multi-pipe type of arrangement that is grouped together in a manifold. The manifold typically has a common oversized inlet and all of the pipes are of the same diameter so that the output velocity is held common. The multi-pipes help to evenly deposit solids in the centrifuge basket by cutting down the distance that the solids have to travel. The primary disadvantage of such a multi-pipe feed device is the expense of providing such a manifold and the difficulty of fitting such a manifold device into a centrifuge.

Either the multi-ported feed pipe or the multi-pipe manifold discussed above can also be adapted with an oscillating mechanism to force up and down, or back and forth movement, to further help distribute the solids. The primary disadvantage of such an oscillating device is the expense of providing such a mechanism and the tendency of such a device to be mechanically unreliable due to wear.

Another type of device which has been implemented to attempt to provide an even distribution is an angled-rotary feed cone. The device consists of a variable speed drive and a two-part angled feed cone which is rotated by the drive about a stationary feed pipe. The feed pipe and the cone are placed inside the basket of a centrifuge. The feed pipe and drive shaft are in an extended position. The bottom half of the cone is attached to the drive shaft and has no opening. The feed from the pipe is deposited on the bottom half of the cone. The two halves of the cone are attached to each other by means of small cylindrical spacers at the outer perimeter of the cone. The spacers have gaps in between them. The slurry exits the assembly through these gaps. As the cone is rotated, the slurry that strikes the bottom cone is flung out in a full circle between the two cones. This creates a relative top-to-bottom painting motion between the feed slurry and the basket due to the angle of the cone and also to the difference in rotational speeds between the basket and the feed cone. The feed cone is effective for enabling an even distribution of the slurry on a basket; however, it is quite expensive to manufacture, operate and maintain, and in fact, it is the most expensive overall of the devices discussed thus far.

U.S. Pat. No. 648,088 discloses a centrifugal concentrator including a feed governor that is used to regulate the feed rate of a material entering a separating casing. The feed governor has an inner pipe with a round hole that is located inside of a floating outer pipe which has an inverted triangular opening so that the wider part of the triangle is above the apex of the governor. When the outer pipe is in the fully down position the wide portion of the triangle aligns with the hole in the inner pipe forming a dual port. This allows for the highest flow slurry through this dual port. An increase in pressure caused by the accumulating volume of the slurry pushes the outer pipe upward. This upward movement of the outer pipe decreases the size of the feed opening because the triangle is moved in alignment with the port. The blockage of the ports slows the rate of feed into the separation casing. The net result is that the inflow into the casing is roughly equal to the outflow of material out of the casing. The disclosed feed governor is designed to vary feed flow rate at a single discharge point on a feed pipe. Because there is a single feed point there remains the possibility with this type of device that solids may accumulate at one point.

A three-pipe system is disclosed in U.S. Pat. No. 2,648,568 that uses a centrifugal pipe pump for slinging out material, such as paint, in a tangential direction to the pipe transporting the material. The device includes a stationary-slotted innermost pipe, a small diagonally-slotted rotating secondary pipe, and a stationary-slotted outer pipe. The two slotted pipes are positioned so that the slots are not aligned with each other. A liquid material, such as paint, herbicide, or pesticide is fed from a self-contained reservoir into the innermost stationary pipe. The rotating secondary pipe picks up a small amount of the feed material when it passes the inner pipe slot. When the secondary pipe rotates past the slot of the outer pipe, the centrifugal three induced by the rotational motion slings the liquid medium outward in a tangential direction to the rotating pipe. This device takes advantage of the centrifugal motion and the alignment of slots acting together to pump the liquid medium to an intended surface. Unfortunately, this device applied in a filtering centrifuge would often times plug due to the small width of the rotating slot and the large particles that are typically fed to the centrifuge. If the slot was made larger the efficiency of the device as a pump would decrease. Furthermore, the three pipe system of this device would have a tendency to shear the particles as they were forced between the inner and outer pipe. This particle degradation would make filtering more difficult as well as devalue the final product in many cases.

An electrostatic atomizer of liquids which creates a mist-like flow of a finely dispersed liquid exiting an outer slot is disclosed in U.S. Pat. No. 2,695,002. This patent describes many variations of an inner helical groove or series of inner helically-positioned holes which feed an electrostatically-charged liquid through a straight slot or straight series of perforations. The relative motion of the inner tube to the stationary outer tube creates the mist-like flow of the electrically-charged liquid. Because of the electrical arrangement, the electrostatic atomizer has a feed inlet on one end and a drive on the other end. However, it is impractical to implement a mist-like flow given the large particle size, high velocity, and solids concentration of the slurry in a centrifuge.

Another spraying device which attempts to provide uniform distribution is disclosed in U.S. Pat. No. 2,994,482. This device is designed for the distribution of gas and liquid to contact apparatus such as elements of a cooling tower. The disclosed spraying device has a rotating outer tube with a helical spiral of perforations and a stationary inner pipe with a straight slot. The device sprays in one direction only and the spray travels longitudinally from one end to the other in one revolution. Then the spray is forced back to the opposite end and begins its travel again. Such an arrangement is ineffective for achieving a uniform distribution because the medium is unevenly applied due to an uneven jumping motion created by the abrupt change from one end to the opposite one without spraying points located in-between.

The inability to apply a medium in an uninterrupted fashion is an inherent disadvantage of both the disclosed container rinsing apparatus of U.S. Pat. No. 3,136,324 and the spray spout for use in a dishwashing machine disclosed in U.S. Pat. No. 3,146,953. Both of these devices employ grooves and rotational elements to attempt to distribute liquids in a uniform fashion but also share the disadvantage of spraying liquid in one direction only, and then jumping back to the opposite end without hitting points in-between following the direction change.

U.S. Pat. No. 3,348,767 discloses an entire centrifugal separator having a combination open screen area for the passage of a wash liquid. The feed portion of the process occurs in the sedimentation area of the basket. The disclosed centrifuge includes a reciprocating wash pipe that pours wash liquid into various dam segments of a large hollow cylinder by using a lengthwise reciprocating sliding movement. The liquid is discharged in a full 360° circle. Such a device would be ineffective in a filtering basket-type centrifuge because the basket is already rotating. Further, the reciprocating motion of the device tends to cause undesirable vibration and increases mechanical wear.

SUMMARY OF THE INVENTION

To overcome the limitations of the prior art discussed above and those which will become apparent in view of the teachings below, an apparatus for providing an evenly-distributed slurry feed to a filtering basket of a centrifuge is described herein. Broadly speaking, the apparatus is comprised of two substantially concentric pipes, an outer stationary pipe and an inner rotatable pipe. The outer pipe is arranged to distribute a slurry having liquid and solid components to a filtering basket that is rotated as part of a centrifuge. The outer pipe has a longitudinally-oriented distribution port which is formed by at least one aperture. The inner pipe has at least one substantially helically shaped discharge port which is also formed by at least one aperture. The inner pipe may be rotated by a rotatable mechanism such as a drive pulley which is coupled to a motor by a drive belt. When the inner pipe is rotated relative to the stationary outer pipe the distribution port on the outer pipe is intersected at selected positions by portions of the helically shaped discharge port and the slurry feed is discharged through each of these intersected positions. The selected intersection positions are arranged such that the slurry mixture is evenly distributed in a continuous cyclical fashion as long as the inner pipe is rotated. In a preferred embodiment, the helically shaped discharge port is composed of two portions and each portion is a truncated helix. Each of the helices is arranged opposite the other such that one has a right-hand orientation and the other has a left-hand orientation.

BRIEF DESCRIPTION OF THE DRAWING

The objects, advantages and features of the present invention will be more clearly understood by reference to the following detailed disclosure when read in conjunction with the accompanying drawing, in which.

DETAILED DESCRIPTION OF THE PREFERRED EMBODIMENT

Figure 1:
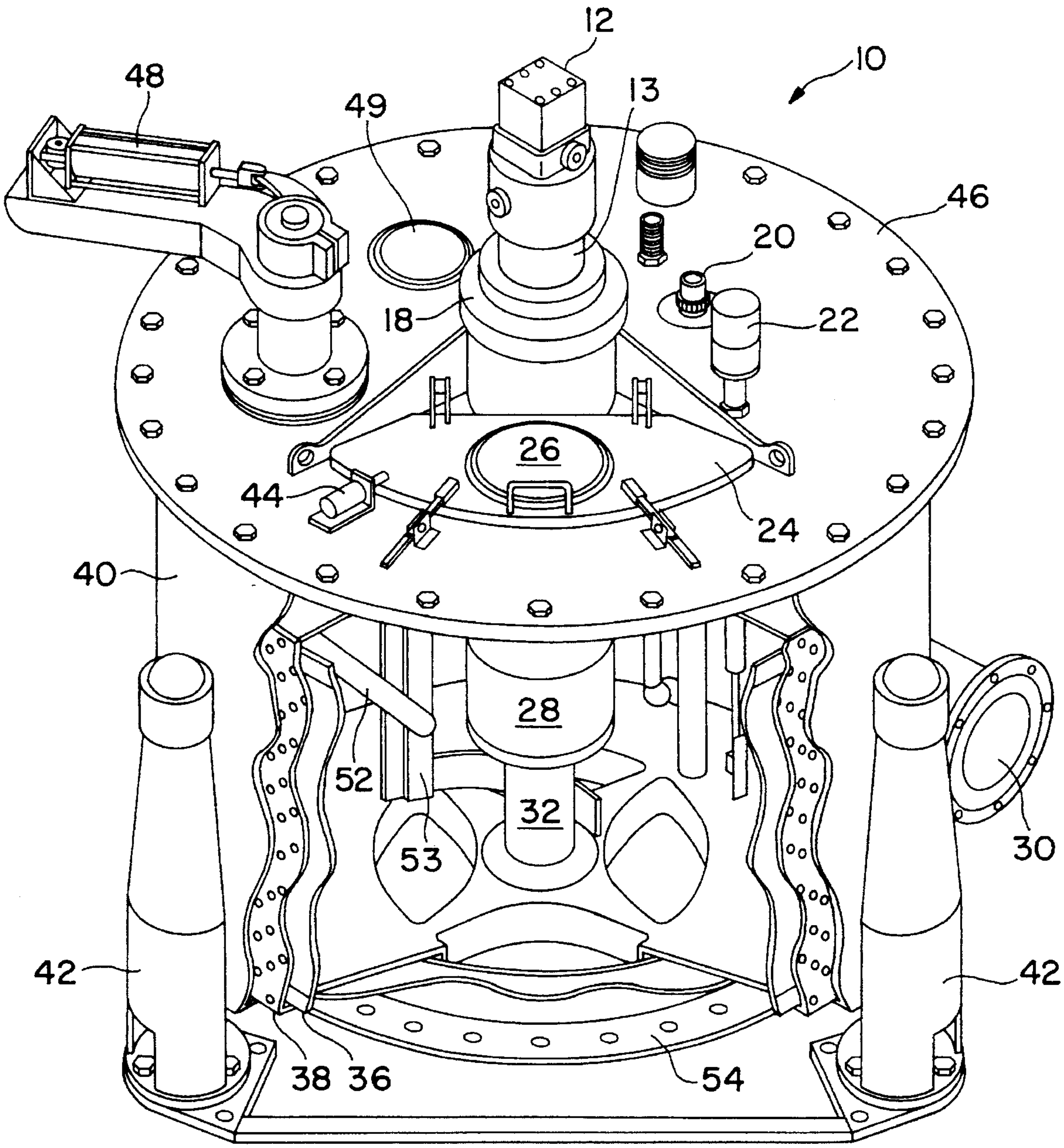
FIG. 1 is a partially broken away perspective view of a filtering-type centrifuge in which the present invention is employed.

This invention is described with reference to a preferred embodiment shown in the drawing figures. In these figures, a like number shown in various figures represents the same or similar elements in each figure. While this invention is described in terms of the best mode for achieving this invention's objectives, it will be appreciated by those skilled in the art that variations may be accomplished in view of these teachings without deviating from the spirit or scope of the invention. In particular, the invention's objective of providing an evenly distributed slurry feed to a filtering basket of a centrifuge is described in terms of an exemplary geometric configuration; however, those skilled in the art will recognize that in view of these teachings the specific geometric configuration could be varied to achieve the invention's objectives.

Centrifuge Operating Environment

FIG. 1 shows a filtering type centrifugal extractor 10 in which this invention operates. Generally, centrifuges of the type in which this invention is useful are known as the filtering-type and employ batch baskets. These types of centrifuges are suitable for many filtering, draining, dehydrating and clarifying processes. Ketema Process Equipment of El Cajon, Calif., provides a basket-type centrifuge sold under the designation "Mark 3". The Mark 3 filtering-type centrifuge is the type of centrifuge that would be improved by employing the apparatus of this invention.

Centrifugal extractor or centrifuge 10 includes a hydraulic motor 12 that turns shaft 13 housed in greased bearing housing 28. Turning shaft 13 spins perforated basket 38 and its accompanying filter media 36 at a speed that is matched to the basket's diameter and its depth to yield a desired cake thickness. Such data is determined empirically and is something that the manufacturer of the centrifuge provides to a customer that purchases such a centrifuge. For example, a 26-inch diameter basket having a depth of 14 inches is preferably spun at approximately 1475 RPM to yield a residual cake thickness of about three inches. RPM probe 18 is employed to monitor and control the rotational speed of the basket. In this example case, the centrifugal force yielded by the turning of such a basket is about 800 G's. In other words, the force that pushes the slurry mixture outward toward the filtering basket is about 800 times that of gravity which otherwise would tend to pull the mixture downward toward the earth's mass.

Enclosure case 40 is shown with part of its covering material removed for the sake of clarity. Rotary distribution feed pipe 20 is used to feed a slurry mixture into the filtering basket of the centrifuge. This feed pipe is explained in detail below and is the subject of this invention. The solid cake is collected on filter media 36 and the liquid component is passed out of the centrifuge through liquid outlet 30. Once a sufficient thickness of cake is collected, hydraulic unloader 48 is used to remove solids in a single plowing motion. The unloader is equipped with support arm 52 to guide the plow 53 uniformly into the cake. The plow swings from a retracted position in the center of the basket to its operating position while the basket 38 rotates at low speed. This action cuts and deflects the cake through the bottom discharge 54. When retracted, it cannot interfere or come into contact with the solids load in the basket.

The plow is typically configured with a safety feature which is preset to not allow operation above what has been determined to be a safe basket speed. If such a safe speed is exceeded the plow is automatically returned to its retracted position. If the cake is not distributed generally evenly across the entire surface area of basket 38 including filter media 36, then the ability to wash the cake is impeded. Further, if the cake is not distributed evenly, then centrifuge assembly 10 will become unbalanced, much like the familiar imbalancing of a washing machine when a laundry load has become unevenly distributed inside the washing basket. Load detector 22 senses the uneven load and can shut off a feed valve (not shown) to shut off flow to feed pipe 20. Such an imbalance is highly undesirable because it disturbs the continuous operation of the centrifuge.

Case 40 further includes case ring 46 upon which various orifices allow operator access into the main body of the centrifuge where the filtering basket is housed. Cover interlock 44 holds hinge cover 24 in place which is used to access the centrifuge parts for maintenance purposes. Sight glass 26 allows an operator to view operation of the centrifuge without stopping its operation. Glass port 49 may serve a purpose similar to sight glass 26, and additionally a light may be mounted above this port to aid maintenance or troubleshooting operations. A tapered spindle 32 is keylocked and facilitates basket removal and machine maintenance. The centrifuge unit is mounted on a common base having shock absorbers housed within link stands 42 to minimize vibration to the foundation on which the unit is mounted in the event of unbalanced loads caused by an uneven distribution of the slurry within the basket.

Rotary Feed Pipe

The rotary distribution feed pipe configuration shown in FIG. 2 offers a significant advancement in the art by reducing the likelihood of an unbalanced load in the centrifuge described with reference to FIG. 1. Feed pipe 20 is comprised of two substantially concentric pipes with inner pipe 102 rotatable inside of stationary outer pipe 101 by means of drive mechanisms (not shown) which attach to rotatable mechanism 66. Mechanism 66 may be, for example, a pulley for engaging a drive belt (not shown). It will be appreciated by those skilled in the art that any mechanism for rotating the inner pipe will be sufficient as long as the inner pipe is rotated while the outer pipe is stationary.

Referring again to FIG. 2, the wall of the outer pipe has a distribution port 80 extending longitudinally along the wall of the outer pipe for a distance which is preferably approximately equal to the depth of basket 38. Distribution port 80 is formed by one or more through apertures 84 which can be of various heights and widths. Attached to the outer pipe is flange 72 which allows the distribution feed pipe assembly to be attached by bolts 71 to a base plate 70 which holds the outer pipe in a stationary position in case ring 46. Cap 87 is attached to the outer pipe at the bottom to close off and prevent the slurry from exiting the bottom of the outer pipe. However, a drain hole 86 is preferably placed in the outer pipe cap to allow residual feed to drain into the centrifuge at the end of a batch feed operation.

Rotatable mechanism 66 is attached to inner pipe 102 by means of set screws 64 and may be driven by any suitable motor or drive device as described above. An inner pipe plug 88 prevents the slurry from exiting out the bottom of the inner pipe. Thrust washer 68 acts as a bearing and wear surface between horizontal rotating surfaces at the top of outer pipe 101 and the bottom of the rotatable mechanism.

Inner pipe 102 can rotate in either direction in relation to the outer pipe. The inner pipe has several through slots which form a truncated helical discharge port that is preferably apportioned into two helices, which will be described in more detail below. The inner pipe has key way 67 to help position rotatable mechanism 66 in order to drive it. Thrust washer 68 is preferably formed of an appropriate bearing material so that it may interface with the top of the outer pipe and the bottom of the rotatable mechanism which is attached to the inner pipe.

The inner and outer pipes are preferably arranged in a close tolerance fit. The inner rotational pipe may be composed of a Teflon material so that it can act as its own bearing and also perform its own sealing function. Inlet 62 at the top of inner pipe 102 allows a feed slurry to enter and flow downward into the inner pipe and exit through the distribution port 80 on the outer pipe when that port is intersected at selected positions by selected portions of the inner pipe's discharge port 90. Discharge port 90 is shown in its entirety in FIGS. 6B and 6C, and will be discussed more below. Such an intersection position is shown in FIG. 2, wherein a selected position of the distribution port is intersected by aperture 82. Aperture 82 is part of distribution port 90. It is this intersection of the distribution port by selected portions of the discharge port, as the inner pipe is rotated, that allows the slurry feed to be discharged and evenly distributed onto the filtering basket.

Figure 2:
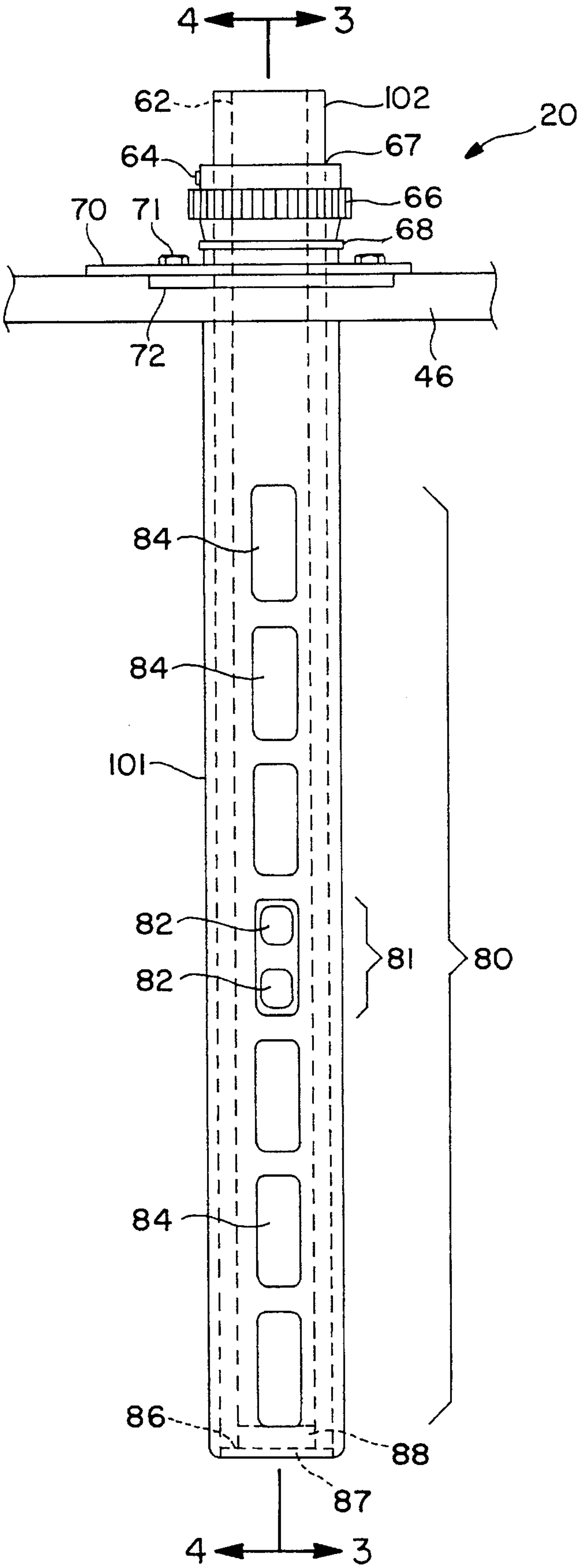
FIG. 2 is a side view of the substantially concentric stationary outer pipe and the rotatable inner pipe of this invention in a configuration that is useful for evenly distributing a slurry feed to the filtering basket of the centrifuge shown in FIG. 1, and showing the distribution port of the outer pipe intersecting the discharge port of the inner pipe.
Figure 3:
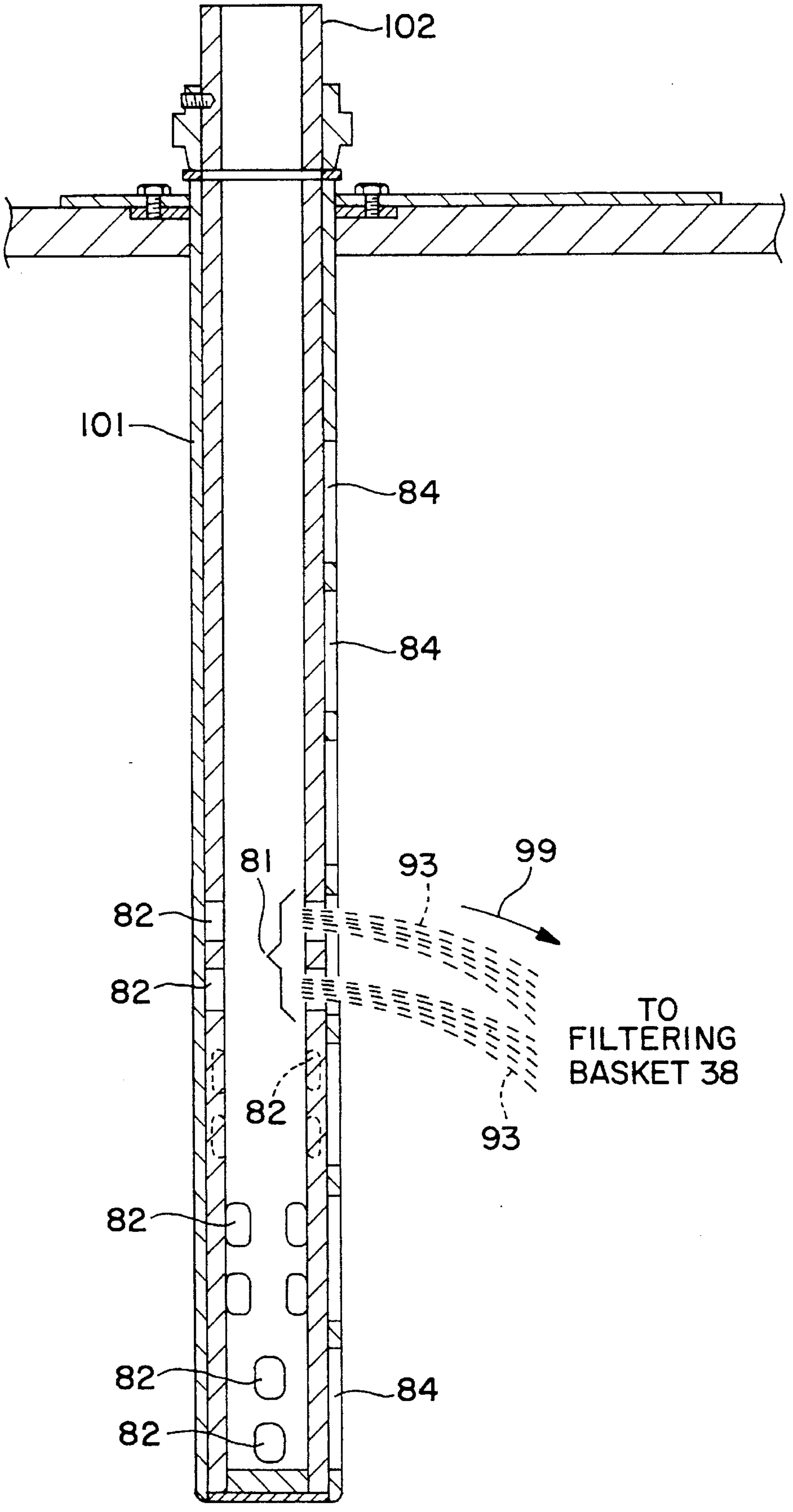
FIG. 3 is a partial sectional view taken along line 3—3 of FIG. 2, showing the distribution of the slurry through the intersection of the discharge port with the distribution port.

FIG. 3 is a side sectional view of FIG. 2 showing aperture 82 that makes up part of the substantially helically shaped discharge port 90. The discharge port is defined by at least one aperture 82 and preferably by a series of apertures 82. The substantially helically shaped discharge port has at least two helically shaped portions.

Several apertures 82 making up a lower section of the port are shown in FIG. 3. Intersection 81 of apertures 82 and 84 of respective discharge and distribution ports is shown with slurry 93 exiting in direction 99 to filtering basket 38.

Figure 4:
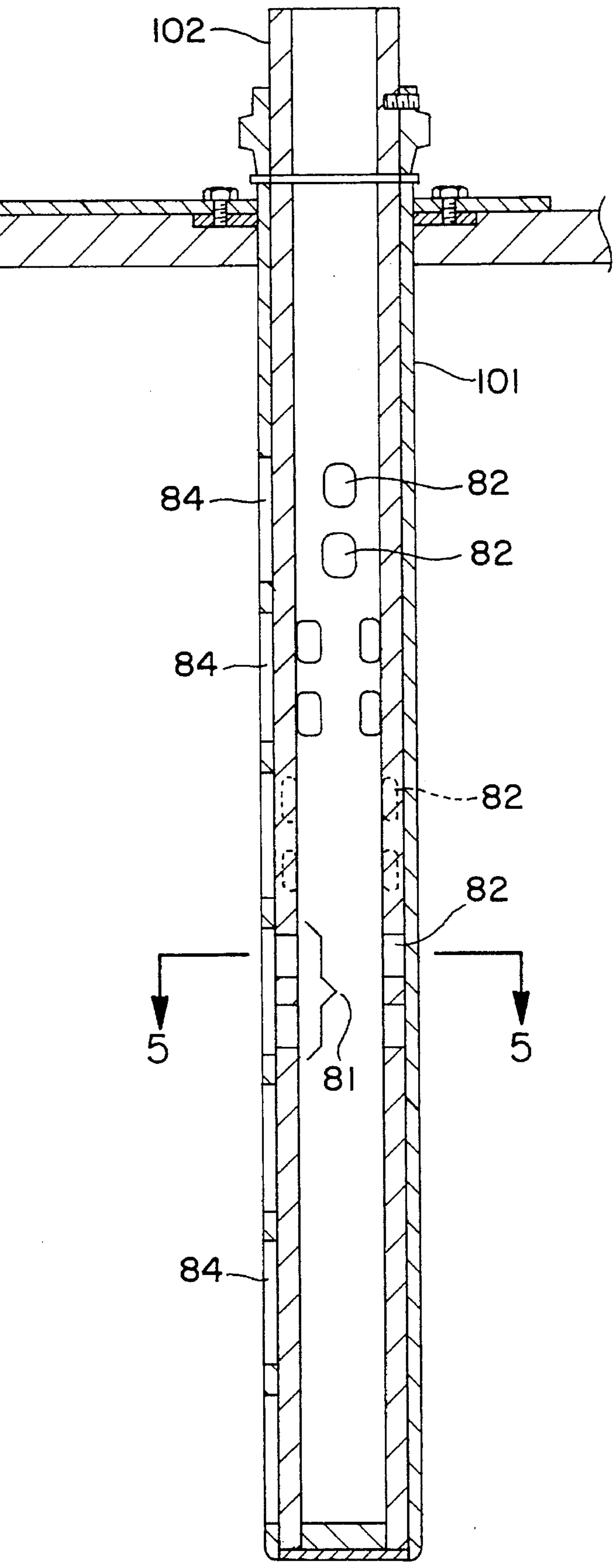
FIG. 4 shows a partial sectional view taken along line 4—4 of the rotary distribution feed pipe configuration shown in FIG. 2.

Referring to FIG. 4, another partial sectional view of the rotational distribution feed pipe configuration of FIG. 2 is shown. In this view, other apertures making up the upper portion of helical discharge port 90 are shown. When FIG. 3 and FIG. 4 are viewed it can be appreciated that the helically shaped discharge port covers the entire circumference of the pipe from one end of the pipe to the other.

Figure 5:
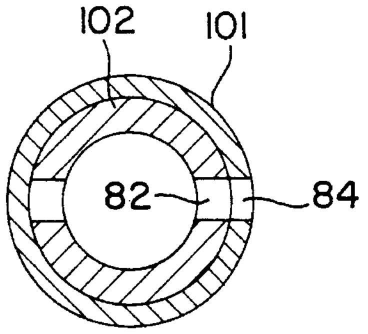
FIG. 5 is a sectional view taken along line 5—5 of FIG. 4 and showing an aligned relationship of the discharge port of the inner rotatable pipe and the distribution port of the outer stationary pipe of FIGS. 2 and 3.

For the sake of clarity, another view of the inner and outer pipes is shown in FIG. 5. This is a sectional view of the configuration shown in FIG. 4 in which an aperture 82 of the inner pipe's discharge port is shown intersecting the distribution port of outer pipe 102 so that the slurry feed may exit through aperture 84.

Figure 6A:
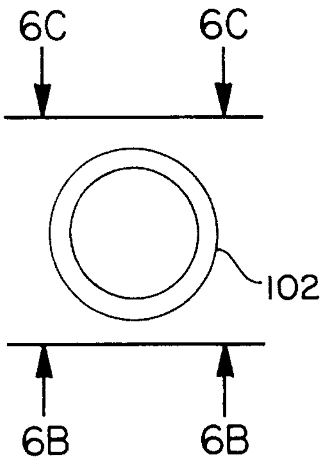
FIG. 6A shows a top view of the inner pipe of FIG. 2.
Figure 6B:
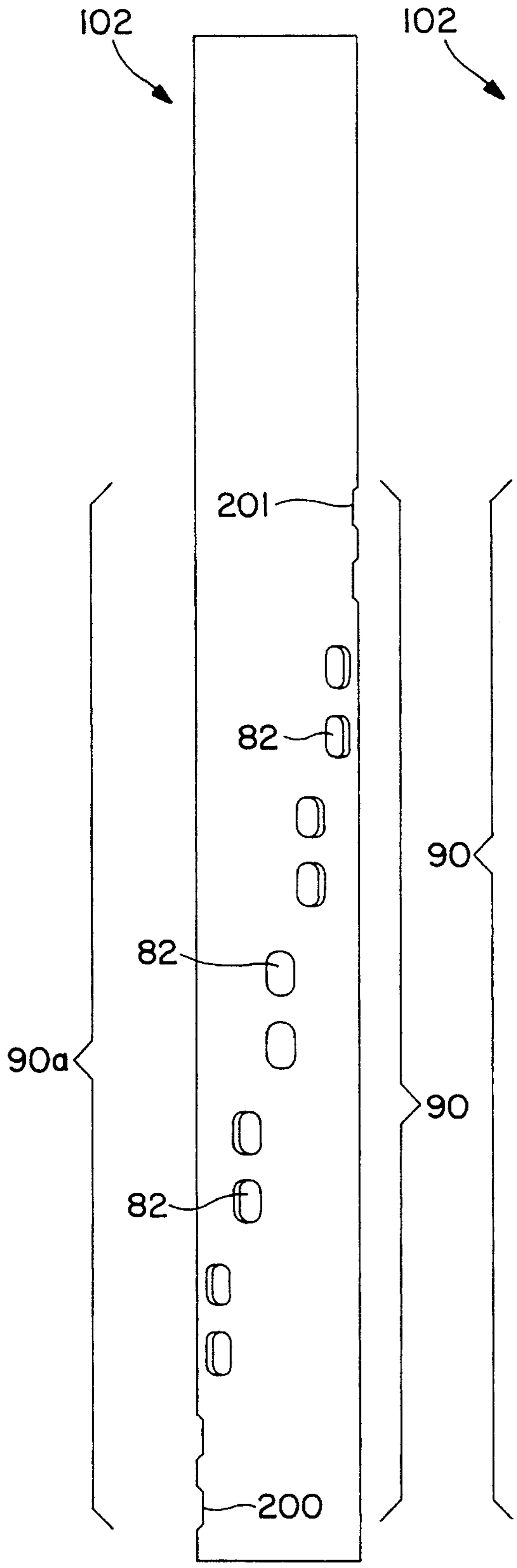
FIG. 6B is a side view of the inner pipe of FIG. 6A viewed in the direction 6B, and illustrates a portion of the substantially helically shaped discharge port formed on the inner pipe, wherein the portion shown forms a truncated helix oriented in a substantially right-hand rotational orientation.

FIG. 6A shows the inner pipe of FIG. 2. Viewing directions 6B and 6C, respectively, are used for the purposes of illustrating the preferred geometry of helical discharge port 90 shown in FIGS. 6B and 6C. FIG. 6B shows a portion **90*a* of helical discharge port 90 which substantially forms a truncated helix defined by at least one aperture 82 and preferably a series of apertures 82. Truncated helix 90*a* shown in FIG. 6B is oriented in essentially a right-hand rotational orientation meaning that the truncated helix is seen to spiral in an essentially clockwise direction. The helix is referred to as truncated because it spirals from a beginning point 200 on one side of the pipe to an ending point 201** on the other side of the pipe, thus covering about 180°, or one-half of the circumference of the pipe.

Figure 6C:
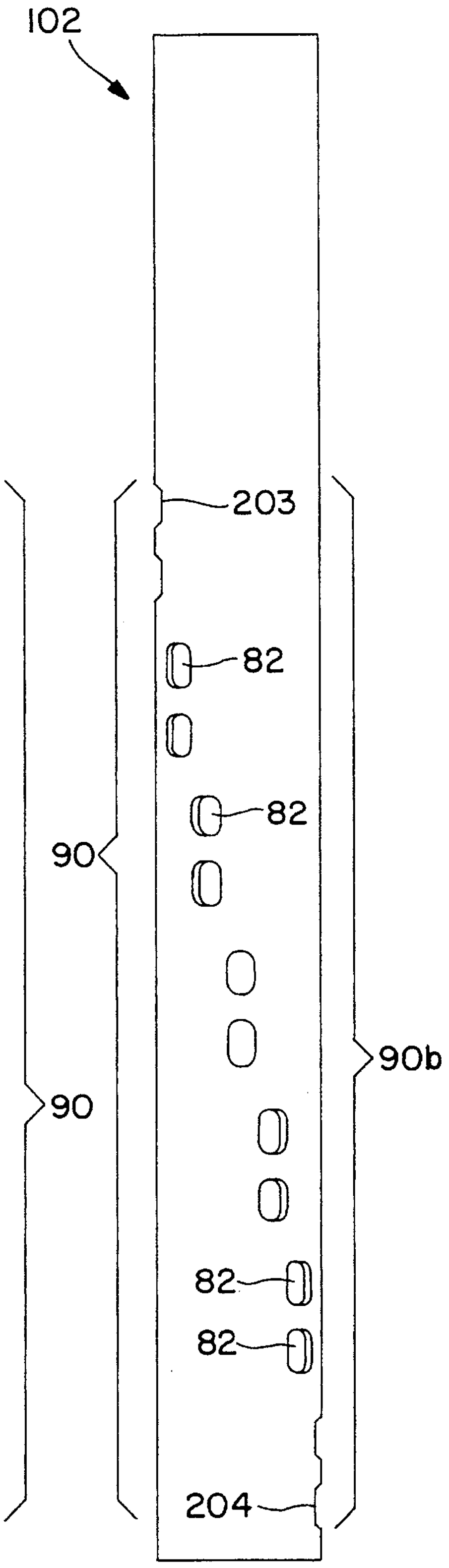
FIG. 6C is a side view of the inner pipe of FIG. 6A viewed in the direction 6C, and illustrates a portion of the substantially helically shaped discharge port formed on the inner pipe, wherein the portion shown forms a truncated helix oriented in a substantially left-hand rotational orientation.
Figures 7A, 7B, 7C, 7D, 7E, 7F, 7G:
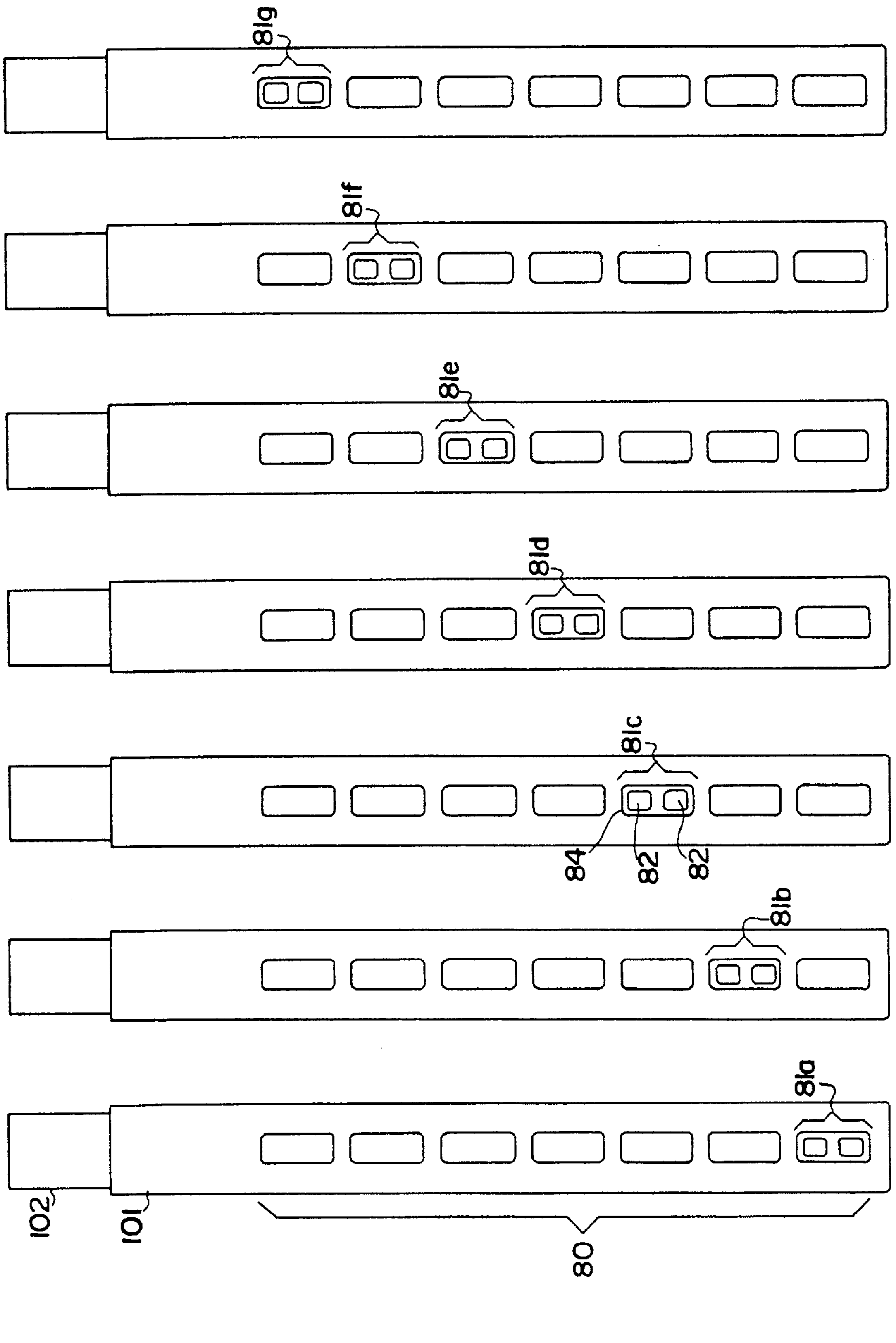
FIG. 7 is a schematic representation of an intersection of the distribution port of the outer pipe at selected positions by selected portions of the discharge port as the inner pipe is rotated in the outer pipe within the centrifuge of FIG. 1.
Figure 7A:
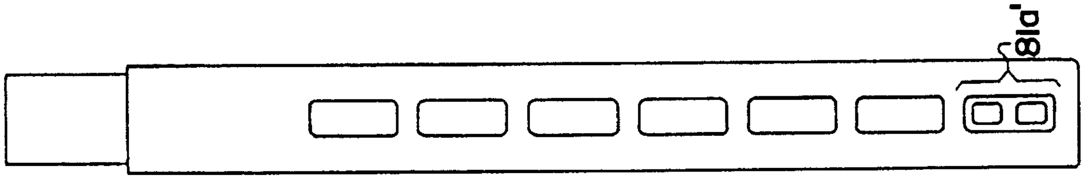
Figure 7L:
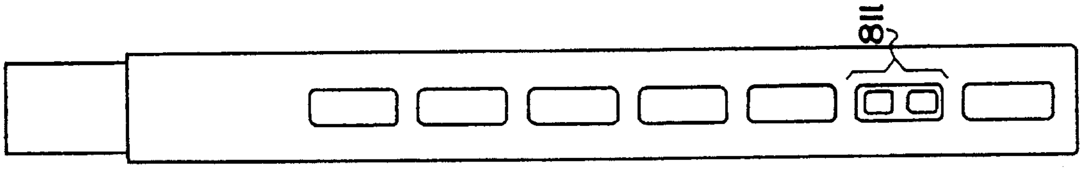
Figure 7K:
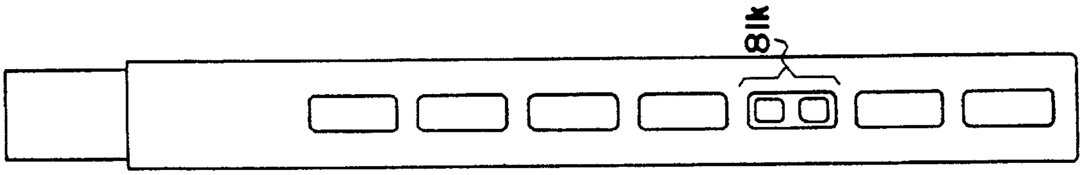
Figure 7J:
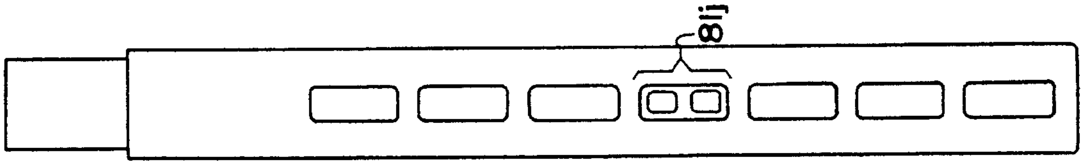
Figure 7I:
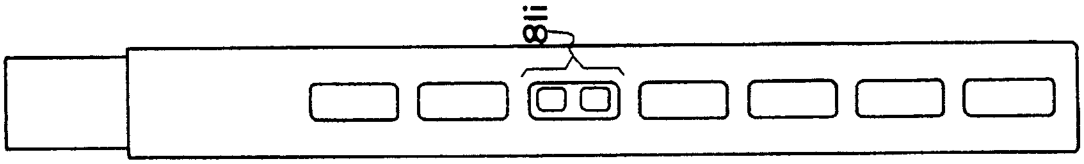
Figure 7H:
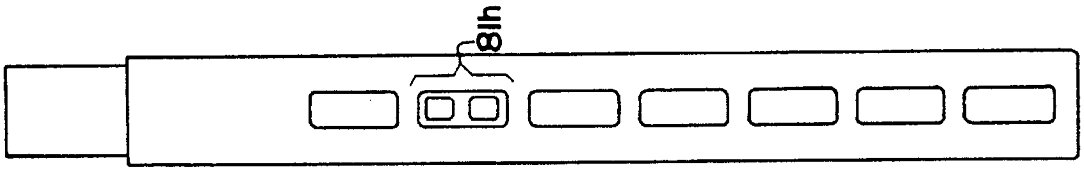

FIG. 6C shows the other half of the circumference of the pipe viewed in direction 6C of FIG. 6A. The shown half of the pipe is covered by a left-hand oriented truncated helix **90*b* which forms the other portion of the substantially helically shaped distribution port 90. The left-hand truncated helix is also comprised of at least one aperture 82 and preferably a series of apertures 82 formed on inner pipe 102. It is the rotation of the inner pipe and the intersection of each portion of the helically shaped discharge port with stationary discharge port 80** that allows for the even and continuous discharge of the slurry onto the filtering basket in the centrifuge.

Generally, during operation, the inner pipe rotates in relation to the stationary outer pipe. As the feed slurry enters from the top of the inner pipe through inlet 62 (FIG. 2) it flows downward and through the openings created by intersection positions of apertures 82 and 84. The exiting feed flows outward in a radial manner. The sequence of exiting moves continuously in a longitudinal manner along distribution port 80 until the end of distribution port 80 is reached. At this point, due to the helical structure 90 being apportioned into two truncated helices, in a preferred embodiment, the feed is allowed to travel in the opposite direction through each selected :intersection position thereby making one complete cycle from one end of the distribution port to the other end and back again. It is preferred that the size of apertures 82 and 84 be so configured that the feed opening formed by the selected intersections remain in a constant cross-sectional area at all times throughout its travel. This ensures that the flow velocity will remain constant to ensure an evenly distributed slurry feed to the filtering basket of the centrifuge.

To illustrate schematically the operation of the invention, FIG. 7 shows one complete cycle of distribution made up of several sequences (A) through (L), and sequence (A'), which is identical to sequence (A), illustrating the start of another cycle. In sequence (A), the intersection of apertures 82 with an aperture 84 forms intersection position **81*a*. At this selected intersection position, the slurry exits to a corresponding point on basket 38. Next, in sequence (B) the intersection of apertures 82 with aperture 84 in selected intersection position 81*b* causes the slurry feed to travel outward in a radial manner to the centrifuge basket at a different corresponding position on the basket. Similarly, in sequences (C) through (F) the intersection of portions of the discharge port with selected positions of the distribution port occurs at selected positions 81*c*–81*f*. Thus, in these sequences it can be seen that the slurry is distributed in a longitudinal manner and, in this example, also in an upwardly moving sequence. In sequence (G) selected intersection position 81*g* is at an opposite end of the discharge port from position 81*a*,** where the discharge originally began.

The sequence of operation continues as inner pipe 102 is rotated. The slurry feed is distributed through the points of each intersection shown in sequences (El) through (L) in positions 81*h*–81*l*. Finally, the intersection position 81*a'* at sequence (A') is an equivalent intersection position as starting position 81*a*. This indicates that a distribution cycle has been completed and another one is ready to begin, repeating the sequence as long as the inner pipe is rotated relative to the outer pipe. Thus, it can be appreciated that this invention offers the advantage that the slurry is evenly distributed from one end of the basket to the other, and including distribution through selected intersection positions in-between.

This invention has now been fully described so that its distinct advantages over the prior art can be appreciated. For example, unlike the multi-ported feed pipe described in the background, the rotary distribution feed pipe discharges feed from one selected intersection point which, in effect, is constantly moving, whereas the multi-ported feed-pipe discharges feed from many openings and, due to gravitational effects, requires that the cross-sectional area be varied in an attempt to control the velocity. In contrast, the cross-sectional area of the opening in the rotational distribution feed pipe of this invention is held constant so that the discharge velocity of the slurry exiting through the distribution port is constant from one end of the distribution port to another end of the distribution port, thus allowing it to feed evenly in each distribution location onto the filtering basket. An even cake profile is achieved when this invention is used in a centrifuge because the constant uniform sweeping action of the rotary distribution feed pipe serves to keep the solids in the cake level at all areas of the basket, even with a fast draining slurry.

The rotary action of this invention has advantages over the vibratory motion of an oscillating feed pipe because it is easier to seal than an oscillating feed pipe and is easier to clean. This is an increasingly important consideration, particularly in pharmaceutical applications. The primary advantage of the present invention over known angled rotary feed cones is that angled rotary feed cones are very expensive and can only be used with a centrifuge which is equipped with a two-motion unloading mechanism which utilizes a small plow that can be parked clear of the feed flow which happens over a full 360° spectrum. This type of unloader offers the disadvantage of not only being more expensive but it is also harder to clean than a configuration enabled by this invention. This invention allows the use of a simpler single motion full basket-length plow, such as hydraulic unloader 48 shown in FIG. 1.

In view of the above description, it is possible that modifications and improvements will occur to those skilled in the art which are within the scope of the appended claims. In particular, it may occur to those skilled in the art to change the orientation directions of the portions of the helically shaped discharge port and this is clearly within the scope of the invention. It may also occur to those skilled in the art to reverse the configurations of the inner and outer pipe such that the outer pipe rotates while the inner pipe is stationary and although this is not believed to be the best mode of operation, it will be appreciated that this is within the scope of the invention as well.

What is claimed is:

1. An apparatus for providing an evenly distributed slurry feed to a filtering basket of a centrifuge, the apparatus comprising:

a stationary outer pipe arranged in a distribution relationship with the filtering basket and having an opening at one end and being closed at an opposite end, the outer pipe having distribution port formed by at least one aperture, the distribution port extending longitudinally along the outer pipe for at least some portion of the distance between the open end and the closed end;

a rotatable inner pipe positioned inside the outer pipe and being substantially concentric with the outer pipe, the rotatable inner pipe having an opening at one end for receiving a slurry feed and being closed at an opposite end, the inner pipe having a substantially helically shaped discharge port formed by at least one aperture, the discharge port being formed on the inner pipe between the open end of the inner pipe and the closed end of the inner pipe; and a rotatable mechanism to rotate the inner pipe relative to the stationary outer pipe;

wherein the distribution port is positioned to be intersected at selected positions by selected portions of the discharge port as the inner pipe is rotated such that the slurry feed is discharged through each selected intersection position and is thereby evenly distributed on the filtering basket.

2. The apparatus of claim 1, wherein the substantially helically shaped discharge port is comprised of a series of apertures.

3. The apparatus of claim 1, wherein the distribution port is formed by a series apertures arranged in a substantially straight sequence.

4. The apparatus of claim 1, wherein the stationary outer pipe is substantially eccentric with the filtering basket.

5. The apparatus of claim 4, and further comprising a filtering media disposed between the filtering basket and the outer pipe.

6. The apparatus of claim 1, wherein the discharge port is configured so that when the inner pipe is rotated the discharge port provides a starting selected intersection position by intersecting one end of the distribution port and an ending selected intersection position by intersecting an opposite end of the distribution port so that the distribution of the slurry to the filtering basket occurs evenly from the starting selected intersection position to the ending selected intersection position and the distribution is repeated in a continuous fashion as long as the inner pipe is rotated relative to the outer pipe.

7. The apparatus of claim 5, wherein the discharge port is configured so that when the inner pipe is rotated the discharge port provides an intermediate selected intersection position by intersecting an intermediate position of the distribution port so that the distribution of the slurry to the filtering basket occurs evenly from the starting selected intersection position, then to the intermediate intersection position, then to the ending intersection position, then back to the intermediate position, and then back to the starting selected intersection position and the distribution is repeated in a continuous fashion as long as the inner pipe is rotated relative to the outer pipe.

8. The apparatus of claim 1, wherein the substantially helically shaped discharge port is comprised of at least two helically shaped portions, wherein a first helically shaped portion substantially forms a first truncated helix defined by at least one aperture and the first truncated helix is oriented in a substantially right-hand rotational orientation and a second helically shaped portion substantially forms a second truncated helix defined by at least one aperture and the second truncated helix is oriented in an substantially left-hand rotational orientation.

9. The apparatus of claim 8, wherein the two helically shaped potions of the substantially helically shaped discharge port are each comprised of a series of apertures.

10. The apparatus of claim 8, wherein the distribution port is formed by a series apertures arranged in a substantially straight sequence.

11. The apparatus of claim 8, wherein the stationary outer pipe is substantially eccentric with the filtering basket.

12. The apparatus of claim 11, and further comprising a filtering media disposed between the filtering basket and the outer pipe.

13. The apparatus of claim 8, wherein the discharge port is configured so that when the inner pipe is rotated, the discharge port provides a starting selected intersection position by intersecting one end of the distribution port and an ending selected intersection position by intersecting an opposite end of the distribution port so that the distribution of the slurry to the filtering basket occurs evenly from the starting selected intersection position to the ending selected intersection position and the distribution is repeated in a continuous fashion as long as the inner pipe is rotated relative to the outer pipe.

14. The apparatus of claim 13, wherein the discharge port is configured so that when the inner pipe is rotated, the discharge port provides an intermediate selected intersection position by intersecting an intermediate position of the distribution port so that the distribution of the slurry to the filtering basket occurs evenly from the starting selected intersection position, then to the intermediate intersection position, then to the ending intersection position, then back to the intermediate position, and then back to the starting selected intersection position and the distribution is repeated in a continuous fashion as long as the inner pipe is rotated relative to the outer pipe.

15. An apparatus for providing an evenly distributed slurry feed to a filtering basket of a centrifuge, the apparatus comprising:

a stationary outer pipe arranged in a distribution relationship with the filtering basket and having an opening at one end and being closed at an opposite end, the outer pipe having a distribution port formed by a series of apertures arranged in a substantially straight sequence, the distribution port extending longitudinally along the outer pipe for at least some portion of the distance between the open end and the closed end;

a rotatable inner pipe positioned inside the outer pipe and being substantially concentric with the outer pipe, and the rotatable inner pipe having an opening at one end for receiving a slurry feed and being closed at an opposite end, the inner pipe having a substantially helically shaped discharge port formed by a series of apertures, the discharge port being formed on the inner pipe between the open end of the inner pipe and the closed end of the inner pipe; and a rotatable mechanism to rotate the inner pipe relative to the stationary outer pipe;

wherein the distribution port is positioned to be intersected at selected positions by selected portions of the discharge port as the inner pipe is rotated such that the slurry feed is discharged through each selected intersection position and is thereby evenly distributed on the filtering basket.

16. The apparatus of claim 15, wherein the stationary outer pipe is substantially eccentric with the filtering basket.

17. The apparatus of claim 16, and further comprising a filtering media disposed between the filtering basket and the outer pipe.

18. An apparatus for providing an evenly distributed slurry feed to a filtering basket of a centrifuge, the apparatus comprising:

a stationary outer pipe arranged in a distribution relationship with the filtering basket and having an opening at one end and being closed at an opposite end, the outer pipe having a distribution port formed by a series of apertures arranged in a substantially straight sequence, the distribution port extending longitudinally along the outer pipe for at least some portion of the distance between the open end and the closed end; and a rotatable inner pipe positioned inside the outer pipe and being substantially concentric with the outer pipe, and the rotatable inner pipe having an opening at one end for receiving a slurry feed and being closed at an opposite end, the inner pipe having a substantially helically shaped discharge port formed by a series of apertures, the discharge port being formed on the inner pipe between the open end of the inner pipe and the closed end of the inner pipe, and the discharge port includes at least two helically shaped portions, wherein a first helically shaped portion substantially forms a first truncated helix defined by at least one aperture and the first truncated helix is oriented in an substantially right-hand rotational orientation and a second helically shaped portion substantially forms a second truncated helix defined by at least one aperture and the second truncated helix is oriented in an substantially left-hand rotational orientation.

19. The apparatus of claim 18, further comprising:

a rotatable mechanism to rotate the inner pipe relative to the stationary outer pipe;

wherein the distribution port is positioned to be intersected at selected positions by selected portions of the discharge port as the inner pipe is rotated such that the slurry feed is discharged through each selected intersection position and is thereby evenly distributed on the filtering basket.

20. The apparatus of claim 18, wherein the stationary outer pipe is substantially eccentric with the filtering basket.

21. The apparatus of claim 20, and further comprising a filtering media disposed between the filtering basket and the outer pipe.

22. A method of making an apparatus for providing an evenly distributed slurry feed to a filtering basket of a centrifuge, the method comprising the steps of:

arranging a stationary outer pipe having an opening at one end and being closed at an opposite end in a distribution relationship with the filtering basket;

forming a longitudinally extending distribution port having at least one aperture along the outer pipe for a portion of the distance between the open end and the closed end;

positioning a rotatable inner pipe inside the outer pipe that is substantially concentric with the outer pipe, wherein the rotatable inner pipe has an opening at one end for receiving a slurry feed and is closed at an opposite end;

forming a substantially helically shaped discharge port having at least one aperture on the inner pipe between the open end of the inner pipe and the closed end of the inner pipe;

coupling a rotatable mechanism to the inner pipe to rotate the inner pipe relative to the stationary outer pipe; and positioning the distribution port to be intersected at selected positions by selected portions of the discharge port as the inner pipe is rotated such that the slurry feed is discharged through each selected intersection position and is thereby evenly distributed on the filtering basket.

23. The method of claim 22, wherein the substantially helically shaped discharge port is comprised of a series of apertures.

24. The method of claim 22, wherein the distribution port is formed by a series of apertures arranged in a substantially straight sequence.

25. The method of claim 22, wherein the stationary outer pipe is substantially eccentric with the filtering basket.

26. The method of claim 25, wherein a filtering media is disposed between the filtering basket and the outer pipe.

27. The method of claim 22, wherein the substantially helically shaped discharge port is comprised of at least two helically shaped portions, wherein a first helically shaped portion substantially forms a first truncated helix defined by at least one aperture and the first truncated helix is oriented in a substantially right-hand rotational orientation and a second helically shaped portion substantially forms a second truncated helix defined by at least one aperture and the second truncated helix is oriented in an substantially left-hand rotational orientation.

28. A method of providing an evenly distributed slurry feed to a filtering basket of a centrifuge, the method comprising the steps of:

providing a stationary outer pipe having an opening at one end and being closed at an opposite end and having a longitudinally extending distribution port, the distribution port having at least one aperture slot;

arranging the stationary outer pipe with the distribution port facing a centrifuge filtering basket;

providing a rotatable inner pipe having an opening at one end for receiving a slurry feed and being closed at an opposite end, the inner pipe further having a substantially helically shaped discharge port having at least one aperture on the inner pipe between the open end of the inner pipe and the closed end of the inner pipe;

positioning the rotatable inner pipe inside the outer pipe in a substantially concentric arrangement;

coupling a rotatable mechanism to the rotatable inner pipe; and rotating the rotatable inner pipe relative to the stationary outer pipe so that the distribution port is intersected by selected portions of the helically shaped discharge port as the inner pipe is rotated thereby discharging the slurry feed through each selected intersection position to evenly distribute the slurry feed on the filtering basket.

29. The method of claim 28, wherein the substantially helically shaped discharge port is comprised of a series of apertures.

30. The method of claim 28, wherein the distribution port is formed by a series of apertures arranged in a substantially straight sequence.

31. The method of claim 28, wherein the stationary outer pipe is substantially eccentric with the filtering basket.

32. The method of claim 31, wherein a filtering media is provided and disposed between the filtering basket and the outer pipe.

33. The method of claim 28, wherein the substantially helically shaped discharge port is comprised of at least two helically shaped portions, wherein a first helically shaped portion substantially forms a first truncated helix defined by at least one aperture and the first truncated helix is oriented in a substantially right-hand rotational orientation and a second helically shaped portion substantially forms a second truncated helix defined by at least one aperture and the second truncated helix is oriented in an substantially left-hand rotational orientation.

* * * * *